United States Patent [19]

Mitchell et al.

[11] Patent Number: 5,225,293

[45] Date of Patent: Jul. 6, 1993

[54] DUAL ACTION BATTERY LATCH FOR A NOTEBOOK COMPUTER

[75] Inventors: Thomas Mitchell, Houston; Stephen M. Myers, Spring, both of Tex.

[73] Assignee: Compaq Computer Corporation, Houston, Tex.

[21] Appl. No.: 825,038

[22] Filed: Jan. 24, 1992

[51] Int. Cl.⁵ .......................................... H01M 2/10
[52] U.S. Cl. ...................................... 429/97; 429/99
[58] Field of Search ................. 429/9, 97, 98, 99, 100, 429/176; 364/708

[56] References Cited

U.S. PATENT DOCUMENTS

| | | | |
|---|---|---|---|
| 3,742,832 | 7/1973 | Stoneharn et al. | 429/98 X |
| 4,903,222 | 2/1990 | Carter et al. | 364/708 |
| 5,019,465 | 5/1991 | Hellon et al. | 429/97 |
| 5,039,580 | 8/1991 | Mori et al. | 429/99 X |
| 5,060,990 | 10/1991 | Smith et al. | 364/708 X |

Primary Examiner—Stephen Kalafut
Attorney, Agent, or Firm—Pravel, Hewitt, Kimball & Krieger

[57] ABSTRACT

Notebook computer having a removable battery having a recess in one side, the side including an overhang over the recess to form an overhang recess. A pivoting latch has two arms, one of which extends into the battery recess and includes a lip extending into the overhang recess. A leaf spring biases the first arm into the battery recess. A second arm of the pivoting latch contacts a release actuator which pivots to counteract the leaf spring to allow the first arm to be removed from the battery recess. A spring at the rear of the computer biases the battery so that the lip is positively retained in the overhang recess so that simply depressing the release actuator does not release the battery. When the battery is pushed back to compress this spring, the lip can clear the overhang and depressing the release actuator results in the first arm clearing the battery recess so that the battery can be removed while the release actuator is depressed.

20 Claims, 2 Drawing Sheets

DUAL ACTION BATTERY LATCH FOR A NOTEBOOK COMPUTER

BACKGROUND OF THE INVENTION

1. Field of the Invention

The invention relates to a latch for positively retaining a removable battery in a battery-powered device and yet allowing the battery to be easily removed.

2. Description of the Related Art

Battery-powered devices, such as laptop and notebook computers, often have provisions for changing the batteries. If an external charger is used, several fully charged extra batteries may be available to extend the battery-powered operating time of the computer. For this reason it is desirable to have the batteries readily removable. This is typically done by providing a hinged door covering the battery. The door contains a latch to mate with the housing. The battery contacts and/or door provide a bias force so that when the battery is installed and the door closed, the latch is positively maintained closed.

However, because laptop and notebook computers are readily portable, there are instances when the door latch can be accidently opened. The jostling under various travel conditions can result in the door opening. The battery then readily falls out of the unit, possibly damaging the battery or interrupting operations.

Other notebook computers have a battery which is very positively retained by covers having a series of latches, catches and clips. However, these batteries are generally not considered to be readily removable and so do not relate to the problem of retaining a readily removable battery.

At least one laptop computer has a movable keyboard, with the battery located under the keyboard storage location. This battery is retained in the unit with two separate latches and is not located behind a door. However, this arrangement is not generally suitable for use with notebook computers as the keyboard is not removable, so the battery must be accessible from a side of the unit. This leads to a conventional latched door design as discussed above.

Therefore there is a need for a design to positively retain yet allow easy removal of a battery from a side of a notebook computer, with the battery not occasionally falling out due to accidental opening of a door.

SUMMARY OF THE INVENTION

A notebook computer system according to the present invention includes a battery which is easily removable yet is very resistant to accidental release. The battery slides into the computer system unit and has a recessed portion on a side, the recess including an overhang on the rear surface of the recess. A spring is provided in the computer system unit to bias the battery in an outward direction.

A pivoting latch element is attached to the computer system unit adjacent to the location of the battery recess. Arms of the latch element extend to each side of the pivot location. A first arm extends into the battery recess and contains a protruding lip which engages the recess overhang when the battery is fully installed. The spring biases the battery so that the overhang and the lip are positively engaged. A leaf spring is attached to the computer system unit to bias the first arm towards the battery to provide further positive engagement of the lip and the overhang.

The second arm contacts a pivoting release actuator. Depressing the release actuator pivots the actuator, contacting the second arm to counteract the bias of the leaf spring on the first arm. When the battery is biased forwardly by the spring, the lip catches the overhang and the first arm does not clear the battery, even if the release actuator is depressed. However, if the battery is pressed rearwardly, compressing the spring until the overhang clears the lip, then depressing the release actuator causes the pivoting latch to clear the battery. If the pressure on the battery is released while the release actuator is still depressed, the spring projects the battery recess past the first arm, into a easily grasped position. The battery is then readily removed.

The battery is retained by simply inserting the battery and pressing against the spring until the first arm and the recess are aligned, with the leaf spring biasing the end of the first arm into the recess. Releasing the battery allows the spring to bias the overhang into the lip and the battery is positively retained.

Therefore a notebook computer incorporating the present invention may contain a simply removable battery and yet the battery is positively retained by the dual action of the overhang and lip and pressure of the spring to reduce chances of accidental release of the battery.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
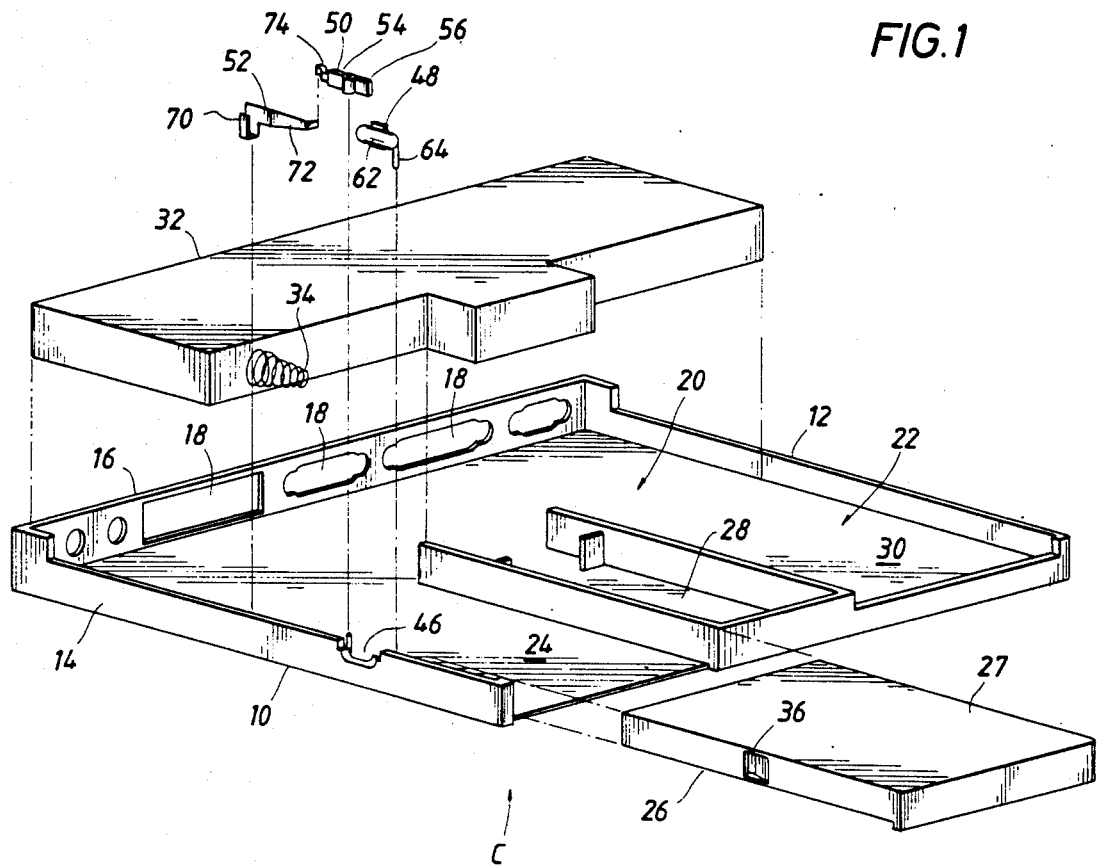
FIG. 1 is an exploded, perspective view of a computer system incorporating a latch according to the present invention.

Referring now to FIG. 1, several components of a notebook computer system C are shown. A base unit 10, preferably formed of plastic as is conventional, forms the bottom portion or shell of the notebook computer C. An upper portion or shell (not shown) is provided to mount over this base unit 10 and encircle the keyboard. The base unit 10 includes right and left sides 12 and 14 and a rear side 16. The rear side 16 preferably contains various openings 18 for the various connectors utilized in notebook computers to allow connection of an external expansion base or devices such as printers, monitors and pointing devices. The base unit 10 of the preferred embodiment is divided generally into front and back portions 22 and 20. The front portion 22 is further divided into three segments, a first or left segment 24 for receiving a battery unit 26, a central section 28 for receiving a hard disk drive unit and a third or right section 30 for receiving a floppy disk drive unit. An electronics assembly housing 32, preferably formed of steel, aluminum or other conducting structure, is located in the rear portion 20 of the base unit 10. Connected to and projecting from the housing 32 is a coil spring 34. Other forms of springs could be utilized as will be readily apparent. The spring 34 is located on the housing 32 so that it is at the rear of the battery or left section 24. The battery 26 includes an outer housing 27 which encloses and provides three-dimensional encasement of a plurality of individual batteries 80 (FIG. 4) and various electronic circuitry (not shown). Contacts are provided to allow electrical signals to be passed to the electronic assembly.

Figure 3:
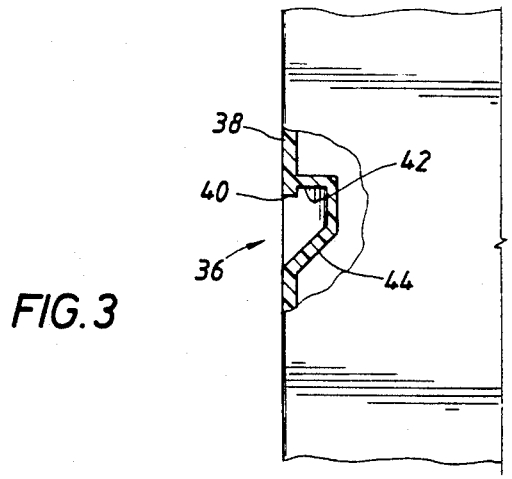
FIG. 3 is a cross-sectional top view of a portion of the side of the battery of FIG. 1 detailing the battery recess.

The battery unit 26 is a generally rectangular parallelepiped having a recess 36 on the left side adjacent to the left side 14 of the base unit 10. The recess 36 is shown in more detail in FIG. 3. The side 38 of the battery 26 is formed to provide the recess 36. This side 38 preferably includes an overhang 40 located at the rear portion of the recess 36 so that an additional recess 42, referred to as the overhang recess, is formed. Preferably the front side 44 of the recess 36 is at an angle to the side 38.

Figure 2:
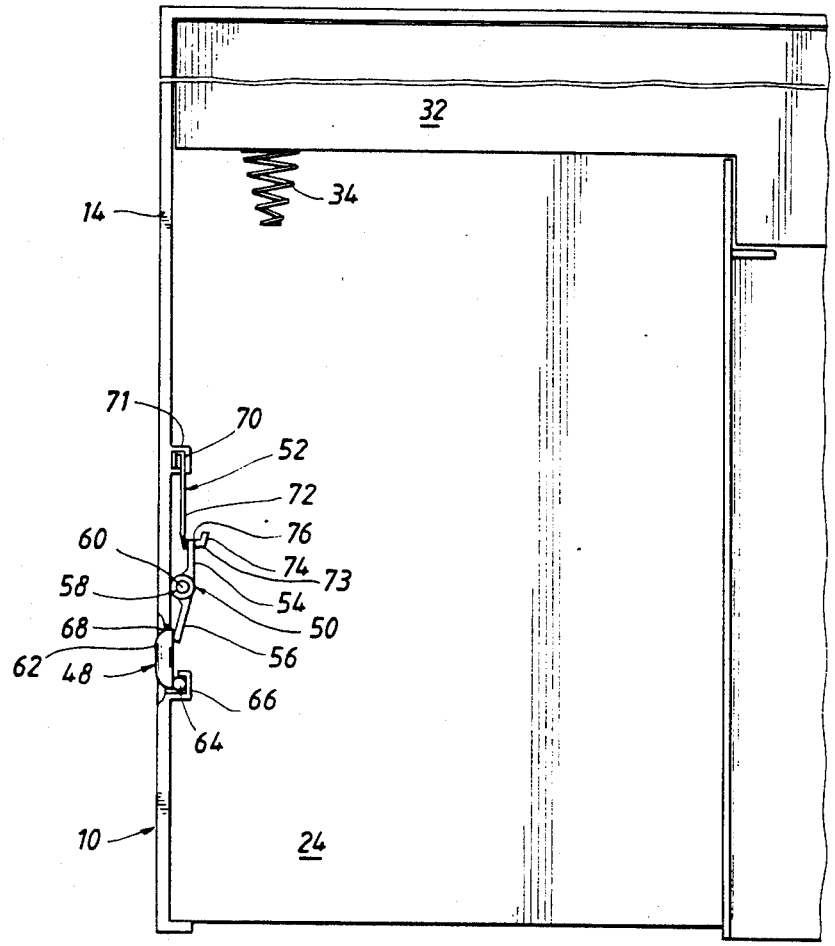
FIG. 2 is a partial top view of the computer system of FIG. 1 with the battery removed.

Returning to FIG. 1, located adjacent the recess 36 when the battery unit 26 is installed in the base unit 10 is a notch 46 in the side 14. Located adjacent this notch 46 are three components. The first component is a pivoting release actuator 48. A pivoting latch 50 is the second component and contacts the release actuator 48. A bias leaf spring 52 also preferably contacts the pivoting latch 50. The orientation and interrelationship between these three elements 48, 50 and 52 is better shown in FIG. 2.

The pivoting latch 50 has a first arm 54 and a second arm 56 on opposite sides of a pivot point 58. The pivot point 58 is preferably formed by having a portion of the pivoting latch 50 encircle a post 60 projecting from the base unit 10. The second arm 56 preferably projects toward the release actuator 48. The release actuator 48 contains a depressing button portion 62 and a pivot pin 64. The pivot pin 64 is located in a recess 66 located in the base unit 10. The pivot pin 64 is located at one end of the release actuator 48 so that upon depression of the button 62, the release actuator 48 pivots about the pivot pin 64 such that the second end 68 of the release actuator 48 contacts the second arm 56 to cause the pivoting latch 50 to rotate.

The leaf spring 52 comprises a first portion 70 encompassing a projection 71 from the base unit 10 to allow the leaf spring 52 to be positively retained. A projecting arm or leaf 72 of the leaf spring 52 contacts the left or pivoting hinge side of the first arm 54 of the pivoting latch 50. The leaf spring 52 is preferably formed such that the leaf spring 52 biases the first arm 54 away from the side 14. Thus when the release actuator 48 is depressed and pivots, contacting the second arm 56, this motion is resisted by the leaf spring 52, so that a force is required to overcome the leaf spring 52.

The end 73 of the first arm 54 is preferably turned at approximately a right angle from the main portion of the first arm 54 and includes a lip 74 projecting rearwardly and generally parallel to the side 14. The lip 74 preferably projects from the end surface 76 of the pivoting latch 50 a distance approximately equal to the overhang recess 42 depth. In this manner, the lip 74 can positively contact and be located in the overhang recess 42 when the battery unit 26 is installed in the computer system C.

Figure 4:
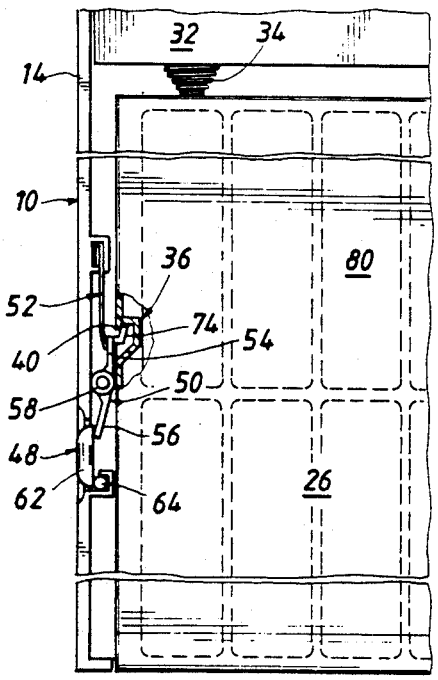
FIG. 4 is a top view of the computer system of FIG. 1 with the battery installed.

Referring now to FIG. 4, a view of the battery unit 26 installed in the base unit 10 is shown. As can be seen, the battery unit 26 is contacting the coil spring 34 and the first arm 54 has been biased by the leaf spring 52 such that the lip 74 is located in the overhang recess 42. The biasing effect of the coil spring 34 is such that the battery unit 26 is biased away from the back of the housing 32 such that the lip 74 is positively engaged and latched in the overhang recess 42 so that if the release actuator 48 is depressed, the pivoting latch 50 can not pivot completely so that the lip 74 does not clear the recess 36. In this manner merely depressing the release actuator 48 when the battery 26 is installed does not allow release of the battery unit 26.

Figure 5:
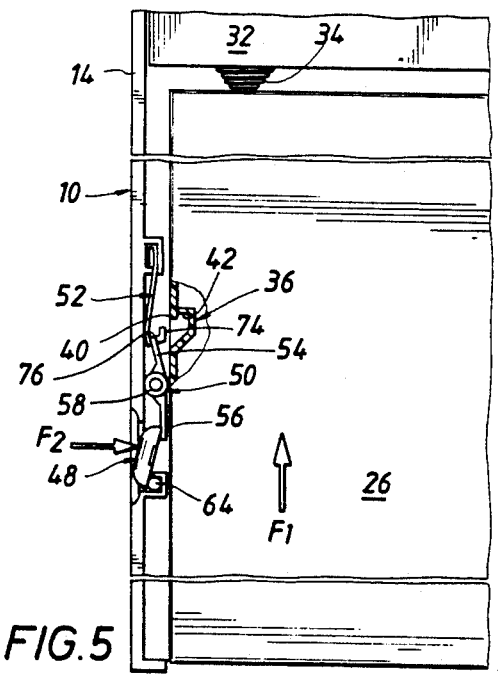
FIG. 5 is a top view of the computer system of FIG. 1 with the battery depressed for release.

Referring now to FIG. 5, the battery unit 26 has been pressed rearwardly by a force $F_1$, so that the coil spring 34 is fully compressed. The additional rearward movement provided by compressing the coil spring 34 is sufficient to allow the recess 36 to have moved rearwardly so that the lip 74 is now no longer positively retained in the overhang recess 42 but instead is now clear of the overhang 40. When the release actuator 48 is depressed at this time by a force $F_2$ and the bias force of the leaf spring 52 is overcome, the first arm 54 and the lip 74 can be cleared from the recess 36 and be completely external to the surface of the battery unit 26. If the release actuator 48 remains depressed, so that the first end 54 remains clear of the battery unit 26, and the depressing or rearward force $F_1$ on the battery unit 26 is released, the coil spring 34 biases the battery unit 26 in a frontwardly direction so that the battery 26 then projects from the front of the base unit 10 and the recess 36 is projected past the end 76 of the first arm 54. With the recess 36 thus past the end 76 of the first arm 54, pressure on the release actuator 48 can be released and the battery 26 can be simply removed.

Therefore a dual action is required to release or remove the battery 26. The battery 26 must first be pressed rearwardly, and while pressed the release actuator 48 must be depressed to allow the pivoting latch 50 to clear the recess 36. While maintaining pressure on the release actuator 48 the pressure on the battery 26 is removed and the battery 26 removed from the computer system C.

It is noted that merely moving or biasing the battery 26 rearwardly without simultaneously depressing the release actuator 48 does not result in the battery 26 being released. This is because the leaf spring 52 continues to bias the end 76 of the first arm 54 into the battery recess 36, thus maintaining a latched state even though the lip 74 may be released from contacting the overhang 40. The first end 76 is still projecting into the battery recess 36 and so the battery 26 remains positively retained. Therefore the combination of the depression of the release actuator 48 and a rearward forcing of the battery unit 26 is required to fully release the pivoting latch 50 and allow the battery 26 to be removed. In this manner accidental removal or release of the battery unit 26 from the computer system C is greatly reduced.

To install the battery 26, only a simply operation is necessary. The battery unit 26 is simply slid into the battery section 24 until the recess 36 and the overhang 40 pass the end 76 of the first arm 54 and the leaf spring 52 biases the end 76 into the recess and the lip 74 into the overhang recess 42. When rearward force on the battery 26 is removed, the coil spring 34 biases the battery unit 26 such that the overhang recess 42 is in positive contact and firmly latches the lip 74 into the battery recess 36, thus again positively retaining the battery.

Numerous variations in the various elements can be developed. For example, the leaf spring 52 can be replaced by a coil spring or other means of biasing the first arm 54 towards the battery 36. Additionally, the various materials of the items could be changed. The release actuator 48 and pivoting latch 50 are preferably formed of relatively stiff plastic, but numerous other materials could be utilized. Similarly, the leaf spring 52 is preferably formed of a resilient metal, but other resilient materials can be used to provide the necessary biasing force.

Having described the invention above, various modifications of the techniques, procedures, material and equipment will be apparent to those in the art. It is intended that all such variations within the scope and spirit of the appended claims be embraced thereby.

We claim:

1. A device having a removable battery comprising:
   a battery having side surfaces, one side surface including a recessed area, said one side surface including a portion overhanging said recessed area forming an overhang recess;
   a housing having an area for receiving said battery, said battery receiving area having a shape generally conforming to said battery;
   latching means connected to said housing and located substantially adjacent said battery recess area when said battery is fully inserted in said housing, said latching means including a member for extending into said battery recessed area, said member including a projecting lip for extending into said overhang recess;
   means connected to said housing and contacting said latching means for biasing said latching means member into said battery recessed area;
   means connected to said housing and contacting said latch means for counteracting said latch bias means when a force is applied to said counteracting means; and
   means for biasing said battery so that when said latching means member is extended into said battery recessed area said projecting lip is maintained in said overhang recess.

2. The device of claim 1, wherein said latching means comprises a pivoting unit, said unit having a first arm extending to one side of the pivot point and a second arm extending to the second side of the pivot point, said first arm including said member for extending into said battery recess.

3. The device of claim 2, wherein said latching means biasing means contacts said first arm and said counteracting means contacts said second arm.

4. The device of claim 3, wherein said housing includes a projection serving as a pivot pin and said pivoting unit encircles said projection.

5. The device of claim 3, wherein said latching means bias means comprises a leaf spring.

6. The device of claim 3, wherein said counteracting means includes a body and a pin extending from one end of said body, the end of said body away from said pin end contacting said second arm, and wherein said housing includes a recess for receiving said counteracting means pin so that said counteracting means pivots about said pin.

7. The device of claim 1, wherein said means for biasing said battery allows said latching means member projecting lip to be removed from said overhang recess when a force opposing said bias means is applied to said battery.

8. The device of claim 7, wherein said battery recess and said latching means member are adapted so that when said force opposing said battery biasing means is applied and a force is applied to said counteracting means, said latching means member is removed from said battery recessed area.

9. The device of claim 7, wherein said battery recess and said latching means member are adapted so that when said force opposing said battery biasing means is applied and a force is not applied to said counteracting means said latching means member remains in said battery recessed area.

10. The device of claim 7, wherein said battery recess and said latching means member are adapted so that when a force is applied to said counteracting means and a force is not applied to oppose said battery biasing means, said lip remains in said overhang recess.

11. The device of claim 1, wherein said latching means, said latching biasing means and said counteracting means are located generally adjacent to a side of said housing and said counteracting means is accessible through the side of said housing.

12. A battery unit comprising:
    a plurality of individual batteries; and
    a housing having a generally rectangular parallelepiped shape, resulting in a plurality of sides, said housing providing three-dimensional encasement of said batteries, said housing further having a recess on one side, said one side further having a portion partially projecting over said recess, forming an overhang recess.

13. The unit of claim 12, wherein said recess includes a front side disposed at an angle to said one side.

14. A device having a removable battery comprising:
    a battery having side surfaces, one side surface including a recessed area, said one side surface including a portion overhanging said recessed area forming an overhang recess;
    a housing having an area for receiving said battery, said battery receiving area having a shape generally conforming to said battery;
    latching means connected to said housing and located substantially adjacent said battery recess area when said battery is fully inserted in said housing, said latching means including a member for extending into said battery recessed area, said member including a projecting lip for extending into said overhang recess; and
    means for biasing said battery so that when said latching means member is extended into said battery recessed area said projecting lip is maintained in said overhang recess.

15. The device of claim 14, wherein said latching means comprises a pivoting unit, said unit having a first arm extending to one side of the pivot point and a second arm extending to the second side of the pivot point, said first arm including said member for extending into said battery recess.

16. The device of claim 15, wherein said housing includes a projection serving as a pivot pin and said pivoting unit encircles said projection.

17. The device of claim 14, further comprising means connected to said housing and contacting said latching means for biasing said latching means member into said battery recessed area.

18. The device of claim 17, wherein said means for biasing said battery allows said latching means member projecting lip to be removed from said overhang recess when a force opposing said bias means is applied to said battery.

19. A battery unit comprising:
a plurality of individual batteries; and
a housing having a generally rectangular parallelepiped shape, resulting in a plurality of sides, said housing further having a recess on one side, said one side further having a fixed portion aligned with said one side and partially projecting over said recess, forming an overhang recess.

20. The unit of claim 19, wherein said recess includes a front side disposed at an angle to said one side.

* * * * *